UNITED STATES PATENT OFFICE.

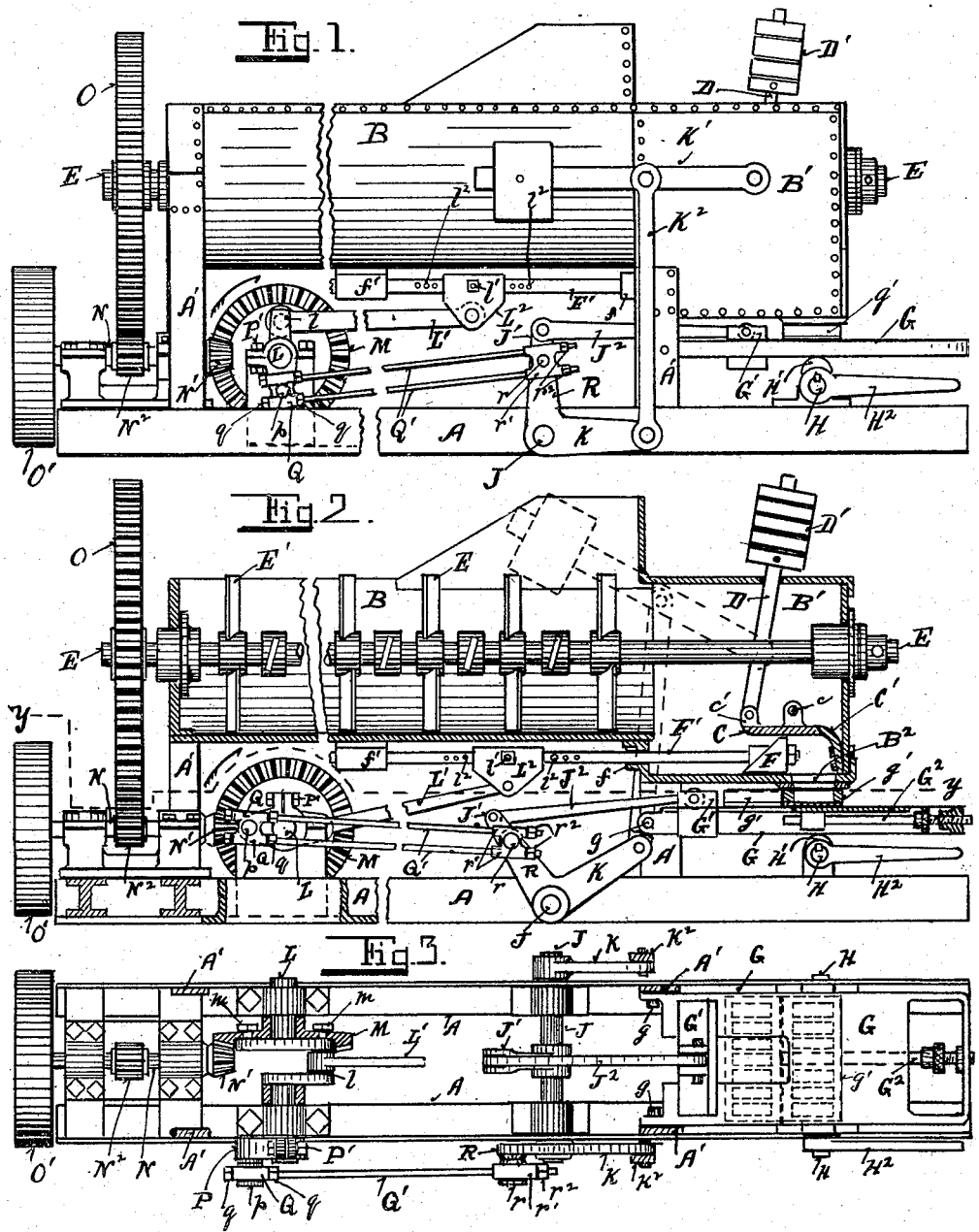

THOMAS J. PARADINE, OF ERIE, PENNSYLVANIA.

BRICKMAKING-MACHINE.

1,200,971.  Specification of Letters Patent.  Patented Oct. 10, 1916.

Application filed December 17, 1915. Serial No. 67,408.

*To all whom it may concern:*

Be it known that I, THOMAS J. PARADINE, a citizen of the United States, residing at Erie, in the county of Erie and State of Pennsylvania, have invented certain new and useful Improvements in Brickmaking-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to machines for making brick, tiles and pottery articles, which comprise a pug-box or trough, a horizontal shaft in said pug-box provided with mixer blades which work the clay or mud and force it forward in the pug-box, and a press mechanism to force the mixed mud out through a die. Machines of this general type are usually employed for operation upon what is known as "soft mud" and the mud is usually forced by the machine into molds, which have been previously sanded, which give the bricks the shape and dimensions desired.

The object of the present invention is to provide in such a machine a horizontal plunger mechanism to force the soft-mud through a suitable opening in the bottom of the discharge end thereof into a brick mold, and self acting mechanism for forcing the filled mold out of the machine, and an empty mold into position to be filled, with crank and link mechanism to draw the mold operating means backward; also to provide a means for regulating and relieving excessive pressure in front of the plunger mechanism.

These and other features of my invention will be fully described and pointed out in the specification and claims, and are illustrated in the accompanying drawings in which:

Figure 1, is a side elevation of a brick machine embodying my invention, with a portion thereof broken away. Fig. 2, is a horizontal central section of the pug-box, and partially in elevation of the base, of a brick machine embodying my invention. Fig. 3, is a horizontal section of the same on the line $y$—$y$ in Fig. 2, showing a plan view of the base-frame and gears mounted thereon.

In these drawings A A, indicate longitudinal base plates, preferably of angle-iron, to which I secure upright parts or plates A′ A′ A′ A′, upon which the pug-box B, is supported. The pug-box B, is trough shaped in cross section, and at the discharge end thereof is provided with a receiving-box B′, which has a discharge opening $B^2$, provided in the bottom thereof. Above this discharge opening I provide a plate C, which is pivoted upon a pivot $c$. The pivot $c$, of the plate C, is located substantially one third of the distance back from the front edge of the plate C, so that substantially two thirds of the width of the plate C, extends back of the pivot $c$. From the rear edge of the plate C, a deflector C′, extends to and is secured to the end of the receiving-box B′. The front edge of the plate C, is provided with an ear $c'$, to which an upright bar D, is pivoted, upon which I place weights D′, of sufficient gravity to prevent the front edge of the plate C, from being raised by ordinary pressure of mud thereunder, but which will permit the front edge of said plate to raise sufficiently to relieve excessive pressure. Within the pug-box I mount a horizontal shaft E, having thereon the usual mixing and feeding arms E′. In the lower part of the receiving-box B′, I place a horizontally slidable plunger F, which is adapted to reciprocate therein and move underneath the plate C. In Fig. 2, the plunger F, is shown in its most extreme forward position, which is desirable when the clay in the machine is running low, as at the end of the day's run, or it becomes necessary to clean out the machine; but ordinarily, when the machine is full of clay, the forward movement of the plunger F, is adjusted, by means of mechanism hereinafter described, so that it will stop when it has passed under substantially one-third of the width of the plate C. This plunger is provided with a rod F′, which extends backwardly therefrom through a properly packed opening $f$, in the rear wall of the box B′, and is supported by a loop or slide $f'$, secured under the pug-box B. Under the receiving-box B′, and in spaced relation thereto I provide a mold receiving frame G, the front end of which is pivoted to the rear upright A′ A′, by means of pivots $g$ $g$; and under the frame G, preferably directly under the discharge opening $B^2$, in the bottom of the receiving-box $B'$, I mount upon the base-plates A A, a rock-shaft H, which is provided with eccentrics $H'$, which engage the frame G, and support it in proper elevation to sustain the brick molds in position to receive mud from the opening $B^2$. I provide a lever $H^2$, on the rock-shaft H, by means of which said shaft may be operated to lower the frame G, when desired, and to raise it again to its proper position. Upon the mold receiving frame G, I place a reciprocating plate $G'$, which is adapted to push brick molds $g'$, placed thereon into position to receive the mud from the discharge opening $B^2$. To prevent the reciprocating plate $G'$, from moving the molds too far, I provide a gage-rod $G^2$, one end of which is screw-threaded and is mounted in a threaded opening in the end of the frame G, so that said rod $G^2$, may be moved forwardly by said screw threads so as to engage and stop the forward movement of the plate $G'$. The plate $G'$, is actuated in its forward movement toward the discharge opening $B^2$, by means of a rock-shaft J, mounted on the base-plates A being connected to said rock-shaft by means of a lever $J'$, and pitman $J^2$.

For operating the rock-shaft J, in one direction, I place thereon a lever K, and on the sides of the receiving box $B'$, I pivot weighted levers $K'$, and from said levers $K'$, bars $K^2$, extend and are pivoted to the ends of the levers K, so that when the sliding plate $G'$, is in its rearmost position, as shown in Figs. 2 and 3, the weighted levers $K'$ will, when free to act as hereinafter described, force it forward and force a filled mold $g'$, out and an empty mold into position.

Upon the base-plates A A, I mount a crank-shaft L, having an intermediate crank $l$, therein. This crank $l$, operates the plunger-rod $F'$ by means of a pitman $L'$, which is pivoted to said crank and to an adjustable slide $L^2$, on said rod. When it is desired to have said rod $F'$, move the entire distance of the throw of the crank $l$, a pin $l'$, is placed through a hole in the slide $L^2$, and a hole through the rod $F'$. When, however, it is desired to shorten the reciprocations of the rod $F'$, the pin $l'$, is removed and a pin is inserted in one of the holes $l^2$, in the rod $F'$, at each side of the slide $L^2$, so that the slide $L^2$, will move forward and backward in said rod $F'$, until it engages pins placed in the holes $l^2$, at each side thereof. On the crank shaft L, I place bevel gear wheel M, which is non-rotatable thereon, by reason of tap-bolts $m$ $m$, through the web of said bevel gear wheel and into one side of said crank $l$. Horizontally mounted upon the base frame of the machine is a shaft N, upon which is a bevel pinion $N'$, which intermeshes with the bevel wheel M.

I also secure upon said shaft N, a spur pinion $N^2$, which intermeshes with a spur gear wheel O, secured on the shaft E, and upon the shaft N, I secure a pulley wheel $O'$, to receive a driving belt. Upon one end of the crank-shaft L, I place an adjustable crank P, which is provided with a split hub, and clamping bolt $P'$, so that said crank P, can be adjusted with relation to the crank $l$, as may be desired. Mounted upon the wrist-pin $p$, of the crank P, is a journal box having sleeves Q, Q, in which rods $Q'$ $Q'$, are non-slidably secured, by means of shoulders or nuts $q$ $q$. Upon the rock-shaft J, I place a lever R, provided with a wrist-pin $r$, upon which a journal box is secured which is provided with sleeves $r'$, in which the rods $Q'$, are slidably secured, said rods $Q'$ $Q'$, having nuts $r^2$, $r^2$, thereon to prevent said rods from being drawn out of the sleeves $r$ $r$, so that said rods will only pull on the lever R, but never push thereon. It is therefore obvious that if an obstruction prevents the molds $g'$ $g'$, from being moved forward by the weighted lever $K'$, the crank P will cause the rods Q, to slide through the sleeves $r'$ $r'$, thus preventing any breaking of parts of the mechanism.

In operation the mud from the pug-box B, fills the receiving-box $B'$ above and below the plate C, and the weight thereof forces the lower strata thereof in front of the plunger plate F, when it is moved to its rearmost position, and also rests upon the upper side of the pivoted plate C, to assist in holding it down against the pressure underneath. Assuming the mechanism in the position shown in Fig. 2, with two molds $g'$, in place, the crank $l$, forces the plunger F, forward, which forces the mud under the plate C, out through the opening $B^2$, into the mold thereunder, and as the plunger F, commences to recede, the crank P, through the rods Q, permits the weighted lever $K'$, to move the slide $G'$ forward to push the filled mold $g'$, out of the machine, and an empty mold into position, and as the plunger F starts on its next forward movement the crank P draws the slide $G'$, backward and again raises the weighted lever K, upward, so that an empty mold can be placed between the slide $G'$, and the mold which is being filled. When the receiving-box and pug-box have the maximum amount of clay therein, the forward movement of the plunger F, is shortened so that it will not pass under the plate C, beyond the point where the upward thrust of the clay thereunder is equalized; but when there is less clay in the machine, I adjust the forward movement of the plunger F, so that it will pass farther under the plate C. The forward movement of the plunger F, must always be sufficient to force enough clay through the die opening B², to fill the mold $g'$, but should not move farther.

Having thus fully described the construction and operation of mechanism embodying my invention, what I claim as new and desire to secure by Letters-Patent is:

1. In a machine of the class described, the combination of a pug-box, a mixer therein, a receiving box at the discharge end of said pug-box having a die opening in the bottom thereof, a horizontally reciprocating plunger resting on the bottom of said receiving box, and a horizontal plate intermediately pivoted in said mixing box above said die opening adapted to receive clay discharged into said receiving box thereon whereby said plate will be pressed downward against the upward thrust of the clay being forced through said die opening by said plunger.

2. In a machine of the class described, a receiving-box, having a die opening in the bottom thereof, a mold supporting frame thereunder, a reciprocating slide mounted on said frame, weight and lever mechanism adapted to cause said slide to move forward, crank and pitman mechanism to move said slide backward on said frame, and a screw-threaded rod mounted in said mold supporting frame adapted to limit the forward movement of said reciprocating slide, substantially as described.

3. In a machine of the class described, a pug-box, a receiving box, a horizontally reciprocating plunger in said receiving box, a plunger rod therefor extending rearwardly through the wall of said receiving box, means on the under side of said pug box to support said plunger rod, a slidable member on said plunger rod, means associated with said slidable member adapted to adjust the forward and backward movement of said plunger-rod, a transverse crank-shaft under said pug box, and a pitman journaled to said crank shaft and said slidable member.

In testimony whereof I affix my signature.

THOMAS J. PARADINE.

Copies of this patent may be obtained for five cents each, by addressing the "Commissioner of Patents, Washington, D. C."